United States Patent [19]

Boulier

[11] 4,421,585

[45] Dec. 20, 1983

[54] METHOD FOR PREPARING COVERING SHEETS OR STRIPS IN CREPE RUBBER, FOR USE IN THE PRODUCTION OF SHOES

[75] Inventor: Camille Boulier, Saint-Amand-Montrond, France

[73] Assignee: Chaussures Labelle, France

[21] Appl. No.: 393,602

[22] Filed: Jun. 30, 1982

[30] Foreign Application Priority Data

Jul. 2, 1981 [FR] France .................................. 81 13030

[51] Int. Cl.$^3$ ................................................ B32B 1/00
[52] U.S. Cl. .................................... 156/209; 264/282; 264/284; 264/293
[58] Field of Search ................ 156/183, 209, 219–220, 156/196; 264/293, 282, 284

[56] References Cited

U.S. PATENT DOCUMENTS 4,190,572  2/1980  Nishimura ........................ 264/282 X
4,247,513  1/1981  Liv .................................. 264/293 X Primary Examiner—David A. Simmons
Attorney, Agent, or Firm—Lerner, David, Littenberg, Krumholz & Mentlik

[57] ABSTRACT

The present invention relates to a method for preparing covering sheets or strips in crepe rubber, wherein the creped appearance is retained in the finished product such as shoes made from such sheets or strips, wherein the pieces of rubber are introduced between the cylinders of a mixer of which the relative tangential speed and the variation of the space therebetween ae adjusted to obtain in cold conditions a natural crepe rubber without the arrangement of the molecules in the rubber being broken; the tongue or coagulum thus obtained is run between the cylinders as different ingredients (sulphur, coloring agents, accelerator) are sprinkled over its surface; then said coagulum thus filled and creped is calendered until the required thickness is reached evenly; said coagulum is finally applied to mounting the product such as a shoe, which is thereafter vulcanized in an autoclave.

1 Claim, No Drawings

METHOD FOR PREPARING COVERING SHEETS OR STRIPS IN CREPE RUBBER, FOR USE IN THE PRODUCTION OF SHOES

The present invention relates to a method for preparing covering sheets or strips in crepe rubber, wherein the creped appearance is retained in the finished product such as shoes made from such sheets or strips.

Until now, it has been known to mix pieces of natural rubber with pieces of synthetic rubber, under heat, in a Banbury mixer or in external mixers and to subject these to an aggressive treatment intended to break the "nerve" of the material, in other words to break up the arrangement of the molecules. The process is known in the trade as "destroying" the gum and what is obtained then is a sort of pulp which has lost all resilience.

According to one of the known techniques, the pieces of rubber, of around half a cubic decimeter, are introduced between the cylinders of an external mixer; this treatment takes place under heat for a relatively long period, is moreover particularly aggressive in order to break the "nerve" and to obtain a pulp; the intention being indeed to exert between the said cylinders, strong friction and compression forces.

To give a granular aspect to the product, which is known as creping, the pulp is molded whilst being vulcanized, in a mold of which the surfaces are suitably engraved to give the creped effect. The pulp can also be calendered between a smooth roller and an engraved roller. Furthermore, to improve shaping, carbon or titanium oxide can be introduced into the pulp with the sulphur, the coloring agents and the accelerator.

The disadvantage of this known product is that its gives an artificial-looking surface which cannot be mistaken by anyone for the real thing, and which is not appreciated by the consumers not only because of its undeniable appearance, but also because the consumers inevitably class it as being of poor quality.

It is the object of the present invention to economize on the energy used in the mixing operation by doing away with heat and by reducing the mixing time. Concomitantly, the invention seeks to obtain a natural creped finish which is considerably superior from the point of view of appearance and quality; the object is indeed to offer to the consumers a noble natural product which will not risk to be competed by the aforedescribed unrefined artificial products.

According to the invention, the relative tangential speed of the cylinders and the variation of the space between them are adjusted to obtain the formation of "crepe" or "crinkled" natural rubber, without breaking the "nerve" of the material, at room temperature; the pieces thus mechanically mixed, form a sort of "tongue" or coagulum which, immediately its rear end drops out of the cylinder, is re-introduced therethrough by its front end; various ingredients, preferably in pulverulent form, such as sulphur, coloring materials, accelerator, are sprayed over the coagulum, on at least some of these runs through the cylinders and penetrate into the rubber by the conjugated mild actions of compression and differential friction exerted by the cylinders; the colored, sulphurated and accelerated coagulum thus treated, whose thickness is between 10 and 15 mm, is calendered on smooth and permanently cooled rollers turning at the same tangential speed, in a plurality of successive runs, the distance between these calendering rollers being progressively reduced until the thickness of the resulting strip or sheet is between 1 and 5 mm depending on the use it is wanted for; the shoe or other product is mounted with the side strips and sole sheets, cold-creped as indicated hereinabove, then it is vulcanized in an autoclave in conditions of temperature, pressure and duration appropriate to the special nature of the basic rubber used.

The invention will be more readily understood on reading the following description.

Natural rubber, such as "colorless crepe" or "cutting crepe" is used instead of synthetic rubber. If in the future, a type of synthetic rubber can be produced which shows the same resilient rigidity as natural rubber and the same ability to withstand a cold treatment, heating being still necessary now, such a synthetic rubber could be mixed with the natural rubber in the method described hereinafter.

The rubber is cut into small pieces of about $10 \times 10 \times 5$ cm, which pieces are loosely introduced between the cylinders of an external mixer.

But, contrary to the known treatments, the mixer is so set as to work "cautiously" in order not to "break the nerve" of the rubber. Consequently, the cylinders do not turn at the same speed and the space between them varies, but the relative tangential speed resulting therefrom is such that the friction forces applied on the material and combined to the compression forces, are sufficient to permanently deform said material in cold conditions, without however destroying the "nerve", namely without breaking up the arrangement of the molecules.

This moderate deformation in cold conditions enables to join the pieces together, thus constituting a sort of tongue or coagulum, and concomitantly, to irregularly crinkle the superficial layers which take on a natural crepe or crinkled finish.

To carry out this treatment continuously, the front end of the coagulum is caught by the operator on emerging from the mixer, it is looped and brought back to the inlet and re-introduced between the cylinders just when the rear end of said coagulum drops out therefrom. At the same time, the operator sprinkles different ingredients over the coagulum, adjacent the cylinders, so that said ingredients penetrate into the mass of the rubber as said rubber is creped; the ingredients used are sulphur, coloring agents, an accelerator, etc.

The coagulum, thus treated in cold conditions, and with caution for a limited period of time, is very uneven in thickness, between 10 and 15 mm, and shows a very uneven coarseness which gives to the creped material its natural look, the coagulum having remained firm and resilient.

The coagulum obtained as described is then calendered. To this effect, it is run through the smooth, straight and permanently cooled rollers of the calender, which rollers obviously turn at the same tangential speed in order to avoid friction, and to merely reduce and even up the thickness without destroying or even flattening out the creped effect. After several successive runs through the calenders, the distance between the rollers is gradually reduced and the final thickness varies between 1 and 2.5 mm when producing covering strip and between 3 and 5 mm when producing sheets from which soles for shoes will be cut.

Such creped strips or sheets are to be used in the production of a variety of products, and in particular footwear. In this particular application, each upper is mounted on a sole, then a strip is coated with adhesive and laid over the side and at the base. The resulting shoe is then vulcanized in an autoclave, the conditions of the treatment being appropriate to the particular nature of the basic rubber used. For example, the temperature may be around 120° C. and applied under a pressure of around 8 atmospheres for a period of about one hour.

The invention is in no way limited to the embodiment description given hereinabove and on the contrary covers any modifications that can be brought thereto without departing from the scope thereof.

What is claimed is:

1. Method for preparing covering sheets or strips in crepe rubber, wherein the creped appearance is retained in the finished product such as shoes made from such sheets or strips, said method consisting in introducing substantially parallelepipedal and relatively flat pieces of natural rubber of around half a cubic decimeter, between the cylinders of an external mixer, turning at different tangential speeds, the relative space between the cylinders being reduced after each run therethrough of the resulting rubber coagulum, process wherein:

the relative tangential speed of the cylinders and the variation of the space between them are so adjusted as to obtain the formation of "crepe" or "crinkled" natural rubber without breaking the "nerve" of the material, the pieces thus mechanically mixed, form a sort of a "tongue" or coagulum which, immediately its rear end drops out of the cylinder, is re-introduced therethrough by its front end;

various ingredients, preferably in pulverulent form, such as sulphur, coloring materials, accelerator, are sprayed over the coagulum, on at least some of these runs through the cylinders and penetrate into the rubber by the conjugated mild actions of compression and differential friction exerted by the cylinders;

and the colored, sulphurated and accelerated coagulum thus treated, whose thickness is between 10 and 15 mm, is calendered on smooth and permanently cooled rollers turning at the same tangential speed, in a plurality of successive runs, the distance between these calendering rollers being progressively reduced until the thickness of the resulting strip or sheet is between 1 and 5 mm depending on the use it is wanted for;

and finally, wherein the shoe or other product is mounted with the side strips and sole sheets cold-creped as indicated hereinabove, then it is vulcanized in an autoclave in conditions of temperature, pressure and duration appropriate to the special nature of the basic rubber used.

* * * * *